Patented Feb. 20, 1923.

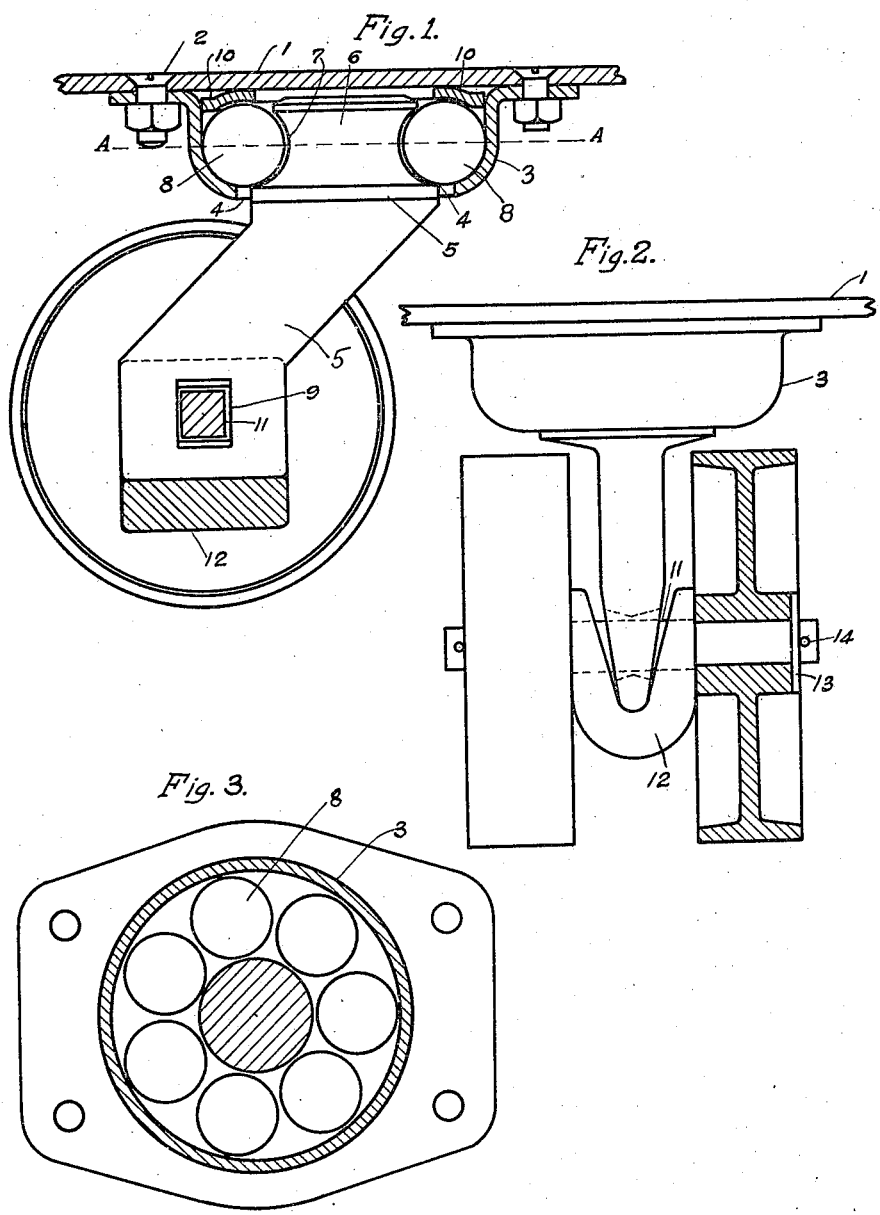

1,445,914

UNITED STATES PATENT OFFICE.

SIGMUND SCHIFF, OF CINCINNATI, OHIO.

CASTER.

Application filed June 3, 1919. Serial No. 301,517.

*To all whom it may concern:*

Be it known that I, SIGMUND SCHIFF, a native of Hungary, and resident of Cincinnati, county of Hamilton, and State of Ohio, have invented a certain new and useful Improvement in Casters, of which the following is a specification.

My invention relates to that type of casters wherein the direction of travel may easily be changed by swivel means and the object of my invention is to provide a caster which shall be simple in construction, easily assembled, easy of operation yet strong and durable to withstand the strains of heavy service without breakage. To accomplish this object I have invented a novel construction which I have illustrated in the drawings and particularly pointed out in the claims.

A novel feature of my invention is to have the antifriction means carry the load stresses, dispensing with holding means such a rivets or screws to hold the caster elements together.

A second feature of my invention is the means I employ to promote easy swiveling which consists in placing the wheel axes outside the circle of antifriction balls. By this means the wheels yield more readily to changes of direction of travel.

A third feature is the means I employ for dividing the load and transmitting one half thereof to each wheel alike. Where the floor is uneven one wheel may drop into a recess and thus be lower than the other. The U shaped stirrup serves to transmit the load equally under such circumstances by tilting slightly without affecting the upright position of the stem.

In the drawings Figure 1 is a vertical section of my caster; Figure 2 is an elevation of the same; Figure 3 is a cross section along the line A—A of Figure 1. In the drawings 1 represents a portion of a structure to which the caster may be applied, being secured thereto by suitable bolts 2. These bolts should be used in sufficient numbers to firmly secure the caster. 3 represents the bowl which, in its preferable form, is pressed from sheet metal and its shape is shown in Figures 1 and 3. The bottom of said bowl is cut out at 4 to permit the stem 5 to extend therethrough without frictional contact with said bowl. The upper part of said stem 5 is provided with a head 6 having an annular recessed surface 7. Metal antifriction balls 8 surround the head 6 and the surface of said head is of such shape as to fit the curve of the balls. The annular ring 10 is formed into shape to fit the balls. When the stem and balls are placed into the bowl, the ring 10 is pressed tightly into the upper part of the bowl to keep the stem, balls and bowl together during shipment and storage. The stem 5 is provided with a square hole 9. The axle 11 extends loosely through this hole and has suspended from it the U shape stirrup 12. The axle 11 has a square cross section between the wheels and the square hole in the stirrup 12 prevents the axle from turning. Two wheels are mounted on the axle, one on each side of the stirrup and are kept on the axle by suitable washers 13 and cotter pins 14. When the load is applied to the caster it is transmitted through the balls, stem and stirrup in succesion to the axle and wheels. As the axes of the wheels are outside the circle of the balls applying the load tips the stem 5 to an angular position caused by the tendency of the wheels to roll in the direction of the offset of the stem. This tipping tendency of the stem is but slight as the balls arrest further tendency to tip. By this construction the bowl stem and balls are held together in operative assembly without the use of a central or pivotal bolt. The bolts marked 2 in Figure 1 serve a twofold purpose, first to hold the caster to the structure to which it is to be applied and second, to hold the caster elements from becoming disassembled while in use. It may also be noted that while the stem is in the center of the axle the load is delivered to the axle at points adjacent to the wheels, where the axle is less likely to bend under the load.

Having described my invention what I claim as new and desire to secure by Letters Patent is:—

1. A caster comprising a bowl, a stem extending within the bowl, a series of balls surrounding and supporting the stem, a horizontal axle carrying a pair of wheels, a stirrup mounted upon said axle between the wheels, and arranged to support the stem at a point directly beneath the said axle.

2. In a caster the combination of a bowl, adapted to accommodate a series of antifriction balls upon its inner edge, a ring seated upon the bowl adjacent the top thereof, a stem extending into the bowl and having an annular recessed surface formed upon said stem interiorly to the bowl, antifriction balls interposed between the stem and the bowl and the ring mounted upon such bowl, the balls being adapted to space the stem from the bowl and the ring, and to permit ready rotation of the stem, and a roller on the stem exteriorly to the bowl.

3. A caster comprising a bowl, a stem extending within the bowl and having an extended cylindrical bearing surface formed thereon exteriorly to the bowl, a series of balls surrounding and supporting the stem, a horizontal axle carrying a pair of wheels, and a stirrup mounted upon said axle between the wheels and adapted to engage the extended cylindrical bearing surface on the stem and to thereby support the stem below the said axle.

4. A caster comprising a bowl, a slotted stem extending into the bowl, a series of balls surrounding and supporting the stem, an axle extending thru the slot in the stem and carrying a pair of wheels, and a stirrup mounted on the axle between the wheels and supporting the stem.

5. A caster comprising a bowl, a slotted stem extending within the bowl, a series of balls surrounding and supporting the stem, an axle extending thru the slot in the stem and carrying a pair of wheels, and a stirrup mounted upon said axle between the wheels and arranged to support the stem at a point directly beneath the said axle.

6. A caster comprising a bowl, a slotted stem extending within the bowl and having an extended semi-cylindrical surface formed thereon exteriorly to the bowl, a series of balls surrounding and supporting the stem, an axle extending thru the slot in the stem and carrying a pair of wheels, and a stirrup mounted upon the axle between the wheels and adapted to engage the extended cylindrical bearing on the stem and to thereby support the stem.

7. A caster comprising a bowl, a slotted stem extending within the bowl and having an extended semi-cylindrical bearing surface formed thereon exteriorly to the bowl, a series of balls surrounding and supporting the stem, a U shaped stirrup having slotted arms, the stem extending between the arms of the stirrup and engaging the central portion of such stirrup, an axle extending thru the slots in the arms and the stem, and wheels mounted on the axle immediately adjacent the stirrup arms.

SIGMUND SCHIFF.

Witnesses:
  D. K. ALLISON,
  WM. HUST.